W. P. SENG.
ELECTRICAL CONTROL SYSTEM FOR AUTOMOBILES.
APPLICATION FILED NOV. 9, 1917.
1,350,426.
Patented Aug. 24, 1920.
6 SHEETS—SHEET 1.
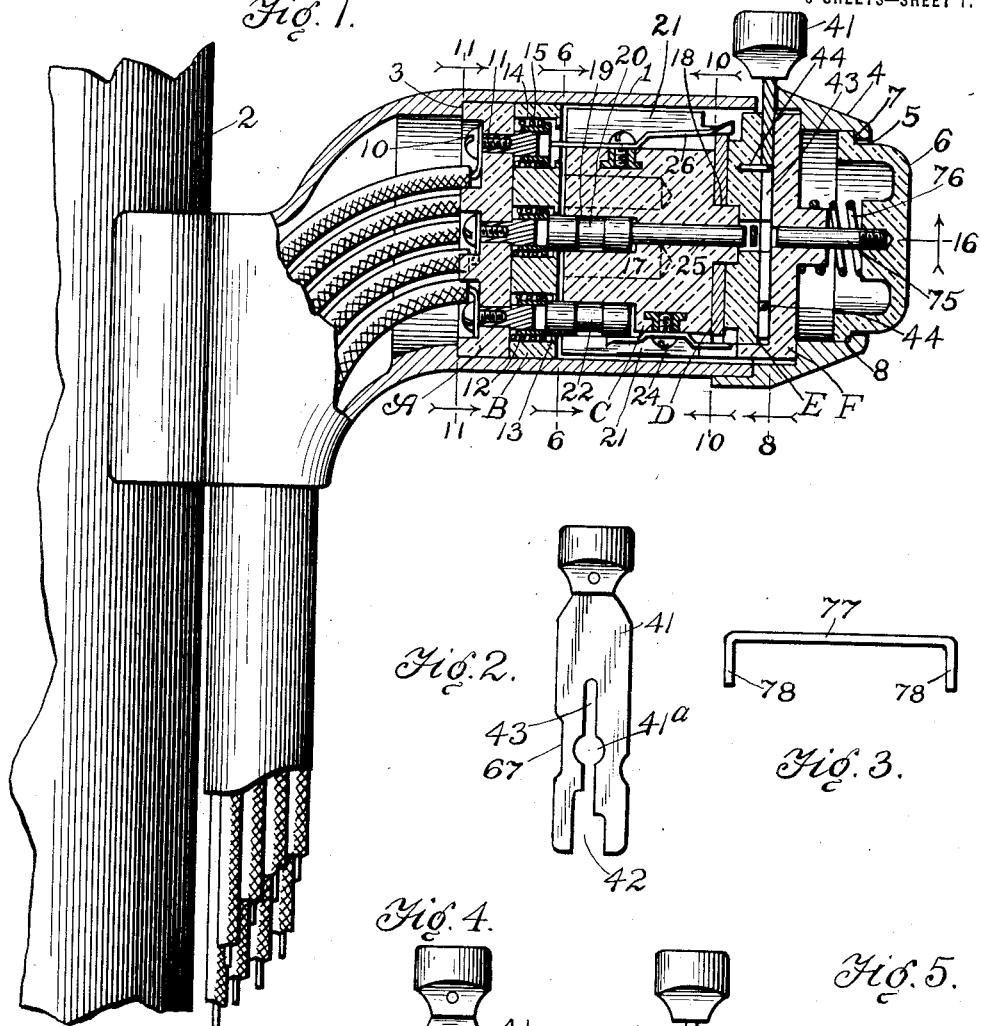
Inventor:
Wendelin P. Seng.
by W. J. Duvall
Attorney.

W. P. SENG.
ELECTRICAL CONTROL SYSTEM FOR AUTOMOBILES.
APPLICATION FILED NOV. 9, 1917.

1,350,426.

Patented Aug. 24, 1920.
6 SHEETS—SHEET 2.

Inventor:
Wendelin P. Seng,
by W. J. Duvall
Attorney.

W. P. SENG.
ELECTRICAL CONTROL SYSTEM FOR AUTOMOBILES.
APPLICATION FILED NOV. 9, 1917.

1,350,426.

Patented Aug. 24, 1920.
6 SHEETS—SHEET 3.

Inventor:
Wendelin P. Seng,
by W. J. Duvale, Attorney.

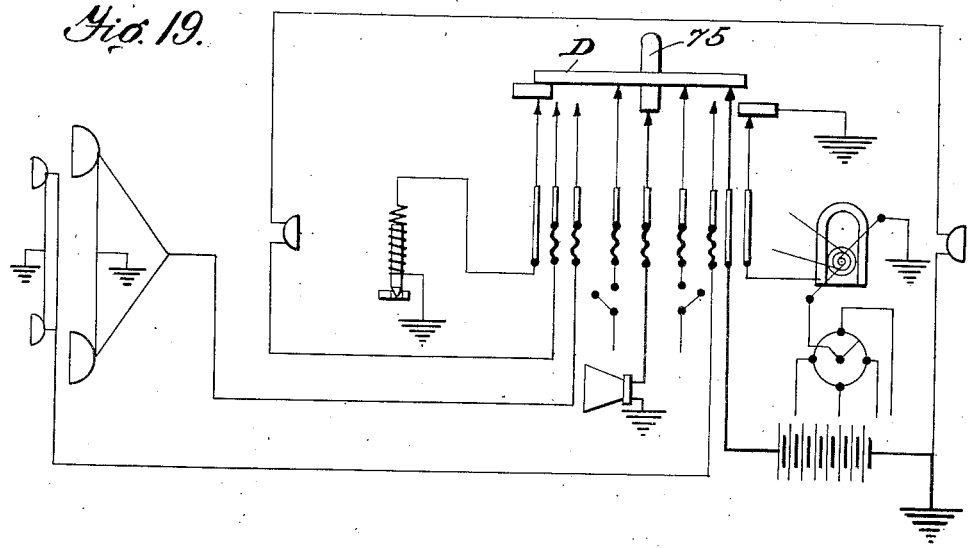
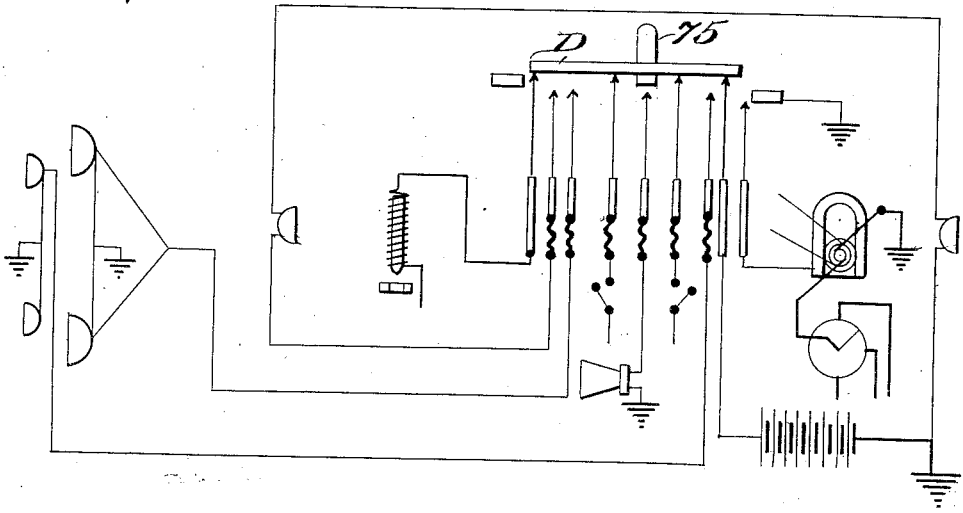

W. P. SENG.
ELECTRICAL CONTROL SYSTEM FOR AUTOMOBILES.
APPLICATION FILED NOV. 9, 1917.

1,350,426.

Patented Aug. 24, 1920.
6 SHEETS—SHEET 6.

Inventor:
Wendelin P. Seng
by W. J. Duvall
Attorney.

UNITED STATES PATENT OFFICE.

WENDELIN P. SENG, OF CHICAGO, ILLINOIS.

ELECTRICAL CONTROL SYSTEM FOR AUTOMOBILES.

1,350,426.  Specification of Letters Patent.  Patented Aug. 24, 1920.

Original application filed February 24, 1917, Serial No. 150,649. Divided and this application filed November 9, 1917. Serial No. 201,145.

*To all whom it may concern:*

Be it known that I, WENDELIN P. SENG, a citizen of the United States, residing at Chicago, in the county of Cook and State of Illinois, have invented a new and useful Electric Control System for Automobiles, of which the following is a specification.

This invention has particular reference to the means employed for regulating the lights and other electrical parts employed in automobiles; and the principal objects in view are to produce a controller, preferably located on the steering-post below the wheel and within easy access of the operator, and through a manipulation of which controller the alarm-device may be sounded, the automobile locked by temporarily interrupting the ignition-circuit and a cutting off of the gasolene supply, and the various lights thrown "on" or "off".

Various other objects and advantages of the invention will hereinafter appear, and the novel features thereof will be particularly pointed out in the appended claims.

Referring to the drawings:

Figure 1 is a fragmentary view in side elevation of a portion of a steering-post to which is secured and illustrated in vertical radial section my improved controller;

Fig. 2 is a detail in elevation of a controller-key for use in connection with my controller;

Fig. 3 is an elevation of one of several binders that may be employed for securing the disk-like sections of the controller together and forming them into a single unit;

Fig. 4 is a detail in front elevation of the controller; the same being removed from its housing;

Fig. 5 is a corresponding view of a side elevation in detail of the controller;

Fig. 19 is a diagrammatic view illustrating the circuits when the controller-key is removed, the magneto "ground" is "on" and the gasolene-circuit "open" and all lights "off";

Fig. 20 is a similar view illustrating the circuits when the controller-key is in position, the magneto "ground" released, the gasolene-circuit "closed" and the lights "on";

Fig. 25 is a sectional view of a construction of gasolene-lock that may form a part of the system.

Similar numerals of reference indicate similar parts in all the figures of the drawings.

Figure 6:
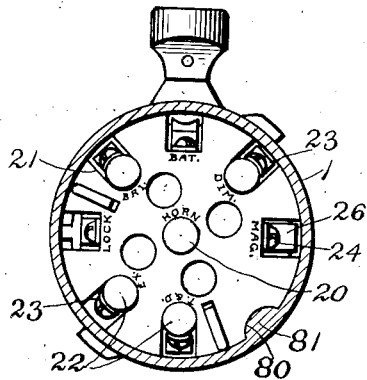
Fig. 6 is a vertical sectional view on the line 6—6 of Fig. 1 in the direction of the arrows.
Figure 7:
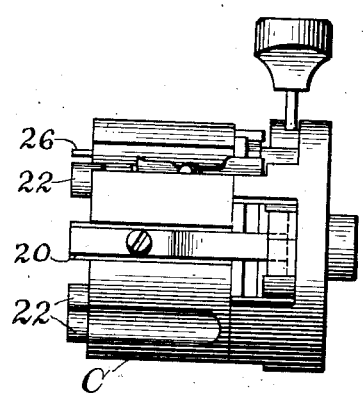
Fig. 7 is a view similar to Fig. 5, the view being taken at the opposite side.
Figure 8:
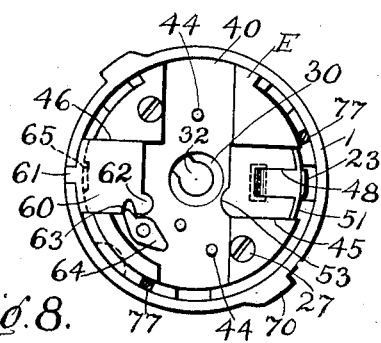
Figs. 8 and 9 are similar views taken on the line 8—8 of Fig. 1, the housing being shown in elevation and the controller-key being removed in Fig. 8 and in position in Fig. 9.

In practising my system, I employ a controller, preferably similar to that which I will now proceed to describe in detail, though it will be understood that modifications and variations may be made and yet be comprehended by my invention.

1 designates a tubular housing, preferably formed of sheet-metal, and at its inner end and in some suitable manner, designed to be secured to the steering-post 2 of the car, preferably immediately below the steering-wheel (not shown) so as to be readily accessible to the hand of the operator or driver.

This housing is preferably open at both ends, the rear opening adjacent the steering-post forming an exit for the several electrical cables leading from the lights, magneto, battery, alarm-device, gasolene-lock, &c., and the front opening providing for the insertion and removal of the hereinafter described controller unit, which being, in this instance, of cylindrical form and of but very slightly less diameter than the tubular housing, is adapted to be received by the same and having its inner end or base rest against an internal annular stop-shoulder 3, formed in said housing.

The front end of the housing is preferably closed by the removable cap or cover 4, having suitable means for locking it in position and against unauthorized tampering with the controller, all as will hereinafter appear.

If it is desired to include the alarm-signal in the system, and such, it will be understood, is preferred though not necessary, the cap 4 is formed with an opening 5, in its crown, for the purpose of receiving a push-button 6, the button filling the opening and projecting at its front somewhat beyond the cap. The opening in the cap may be formed with an internal annular locking-shoulder 7, to engage which an opposing shoulder 8, is formed on the base of the push-button, so that when in position these two shoulders interlock and the button is maintained in its position within the cap.

The controller unit, as herein constructed, comprises disk-like sections, which for convenience, I will designate as A, B, C, D, E and F, said sections approximating each other in diameter and being positioned from front to rear in the order mentioned.

The rear face of the disk A, which I will term the connection-disk, is provided with a central binding-post or screw 9, and with an annular series of similar binding-posts or screws 10, the heads of the screws being countersunk in the rear face of the disk. Each of the binding-posts 9 and 10 is designed to receive an electrical terminal, leading, as the case may be, from the battery, magneto, lights, alarm-device, etc., the central binding-post 9 being utilized for the latter.

These binding-posts are preferably threaded in the rear reduced ends of short contact-plugs 11, the front enlarged ends of which project through and slightly beyond perforations 12, formed in the next adjacent section B, which latter I will term the contact-disk. The outer ends of the perforations 12 are slightly reduced so as to form stop-shoulders 13, and between the latter and the front face of the disk A are located short sleeves 14, the front ends of which are flanged externally. These sleeves each receives and contacts with a contact-plug 11, and each is normally pressed forward against the stop-shoulder 13 of the perforation in which it is located by means of a light spring 15, the latter being coiled about the sleeve and interposed between the flange of the same and the front face of the disk A.

These two disks A and B, subsequent to an assemblage of the parts as described, may be secured removably together by means of screws 16, and thereby maintained in proper relation, and together they constitute the base of the controller unit, being made separable as described for the purpose of facilitating manufacture and assemblage of the parts. This base, carrying the several connections for the electrical conductors, it will be readily apparent, is preferably more or less fixed; that is to say, when it is once positioned, it is seldom if ever necessary to remove it, though it may be removed independently of the remainder of the controller unit which I will now proceed to describe.

Immediately in advance of the base, is positioned in the tubular housing the plug-like disk C, which I will term the fuse-disk. The latter is of greater length than the combined lengths of the sections A and B forming the base, and is axially bored, as at 17, throughout its length, the front end of this bore being surrounded by a forwardly disposed annular bearing-boss 18. The rear portion of the bore 17 is somewhat enlarged so as to form a chamber 19, and within the latter is removably seated an ordinary fuse-plug 20, the rear end of which projects beyond the rear face of the fuse-disk so that when the latter disk contacts with the base-disk the rear end of the fuse-plug is forced into electrical contact with the front flanged end of the yielding contact-sleeve 14 located on the central binding-post 9 and its plug.

In the periphery of the fuse-disk C, and at intervals corresponding with the connections 10 of the base, radial grooves 21 are formed, the inner portions of the walls of the rear halves of which may be curved to approximate the fuse-plugs 22, which, like the central fuse-plug 20, contact with the sleeves 14 of the base. It will be understood that not all of these grooves 21 are thus occupied by fuse-plugs, but only such grooves as are in line with the electric-light circuits. In each of said grooves 21 that are occupied by fuse-plugs, spring contact-fingers 23, are located, and, in this instance, held in position by screws 24. The rear ends of the spring contact-fingers 23 may be made segmental or curved in cross-section, whereby they conform approximately to the contours of the fuse-plugs and are adapted to clamp thereon so as to maintain electrical contact therewith and at the same time retain the plugs in position. It will be apparent that by grasping the rear ends of the fuse-plugs they may be readily removed and others substituted, during which latter operation the rear ends of the spring contact-fingers will readily yield. The forward or opposite ends of the spring contact-fingers project a short distance beyond the front face of the fuse-section.

In the axial bore 17 of the fuse-disk, is located a contact-pin 25, the same being somewhat longer than the bore in which it is located so that its front end projects beyond the bearing-boss 18 of the section or disk and the latter end is in electrical contact with the central fuse-plug.

In those grooves 21 unoccupied by fuse-plugs, (which would be those grooves in circuits other than lamp-circuits), are located and secured in position by screws 24, spring contact-fingers 26. To compensate for the absence of the fuse-plugs in such circuits, the spring contact-fingers 26 are somewhat longer than the spring contact-fingers 23, so that the former project not only in front of the fuse-disk but also in rear of the same, and, like the fuse-plugs, each contacts with that sleeve 14 immediately in its rear.

Next in order comes the metal distributing-plate D, and as the same is rigidly fastened to the adjacent succeeding locking-disk or section E, by screws 27, so that these two elements move together, they will be described jointly.

The distributing-plate is provided at its center with a circular opening 28, at one side of which is formed a communicating radial slot 29. The opening 28 serves as a bearing to receive and move upon the boss 18 of the fuse-section, and a continuation of this opening 28 is formed in the locking section or disk E, as indicated at 30. Opposite the outer end of the slot 29, the locking-section is provided with a slot 31, that communicates with the slot 29 and overlaps the same.

A spring contact-tongue 31ª, has its tail-portion interposed between the distributing-plate and the locking-disk or section and its widened head, 32, positioned within the opening 30 of the locking-section, in which position it will be in line but normally out of contact with the head 32 of the tongue 31ª.

The opposite sides of the distributing-plate or section are cut away and at one end are formed three notches 33, 34, and 35. Designed to engage any one of these notches, according to the distance and direction of rotation of the distributing-plate, and to serve as a detent in connection with said notches for the purpose of holding said distributing-plate in any one of its three positions, is that one of the spring contact-fingers 26 located in the battery-circuit, the front end of this particular spring being rounded transversely whereby it is adapted to readily engage the succeeding notches 33, 34, and 35. Beyond said series of notches, and at one side, is a contact-shoulder 36, designed to contact with the end of the spring contact-finger 23 in circuit with the main-lamps of the head-lights when the distributing-plate has been rotated so that the spring contact-finger of the battery-circuit is in engagement with the notch 35 of the plate, and at the opposite side of said series of notches is a similar contact-shoulder 37, adapted to contact with the spring contact-finger in circuit with the small lamps of the head-lights when the spring contact-finger of the battery-circuit is engaged by the notch 33. It will thus be seen that, in accordance with the present construction, when the distributing-plate is rotated its limit of movement in one direction, we will have head-lights bright, and when rotated the limit of its movement in the opposite direction, we will have head-lights dim, the former being used principally on the road and the latter in operating about the city or when the car is left standing on the streets after dark.

Diametrically opposite the central notch 34 in one side of the distributing-plate, which latter notch is the neutral notch of the controller, a corresponding notch 38, is formed, and into such, when the distributing-plate is in neutral, projects the upper end of that spring contact-finger which is in circuit with the tail and, if employed, dash-lights. When resting within this notch or recess 38, or, in other words, when the distributing-plate is in its neutral position, the circuit of the tail and dash-lights will be broken or interrupted, but at all other times said circuit will be closed because of the fact that the spring contact-finger extending into the notch 38 will contact with either of two contact-shoulders 39, one of which is located at either side of the said notch 38. It will be obvious, therefore, that the circuit of the tail and dash-lights is maintained regardless of whether the controller is adjusted for head-lights bright or head-lights dim, and is only broken or interrupted when the controller is in neutral position and therefore no lights are being used, as in day-light operation of the car.

If desired, the upper end of one of the spring contact-fingers 23 may be inwardly disposed or bent to form a spring contact-tongue 23ª, for the accommodation of which the front face of the fuse-section may be recessed as shown. This tongue projects slightly beyond the face of the fuse-section and is always in yielding contact with the rear face of the metal distributing-plate, so that the circuit of the battery is always maintained. This circuit may include a hand or "trouble-lamp"; that is to say, a lamp may be connected to a socket in the circuit and by employing a sufficiently long cable or conductor the lamp may be carried to any part of the car for the purpose of inspection or making repairs.

A similar circuit may be employed for lamps used for illuminating steps of cars or for lighting the interiors of closed-body cars. Of course, these additional circuits will merely require a duplication of the parts just described, and as such additions may be numerous, I consider them all as being within the purview of my invention.

Formed in the front face of the locking-section or disk E, is a radial recess 40, adapted to receive in a removable manner, a controller-key 41. This key (in case the push-button for sounding the alarm is present,) is formed with a central opening 41$^a$, and in the present instance, is recessed, as at 42, at its inner end, the latter recess communicating with or merging into a narrow longitudinal slot 43. The recess and slot just mentioned are for the purpose of permitting the key to pass certain obstructions provided, in this instance, short pins 44. By varying the number and positions of these obstructions, it will be apparent that special keys will be necessary for operating each controller, so that even though a person may possess a key for a similarly constructed controller, yet he cannot operate this particular controller without possessing the identical key made and adapted for it; this being one of the features of safety embodied in this system.

At right angles to the radial recess 40, and at opposite sides of the central opening in the locking-section E, are formed opposite shallow radially disposed recesses 45 and 46, the purpose of which will now be explained.

Figure 9:
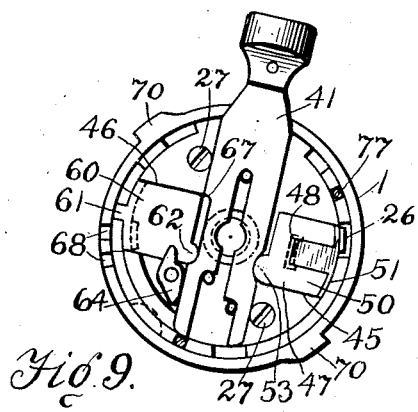
Figure 10:
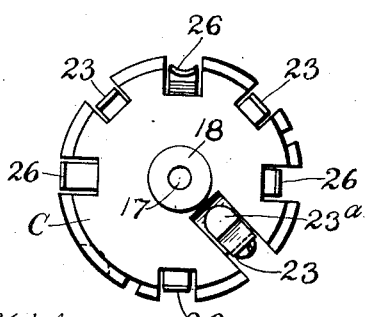
Fig. 10 is a sectional view in detail of the controller unit, the section being taken on the line 10—10 of Fig. 1.
Figure 11:
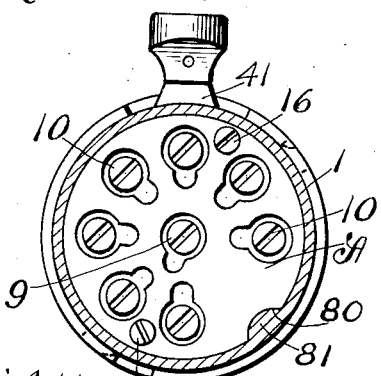
Fig. 11 is a transverse sectional view on the line 11—11 of Fig. 1 viewed in the direction of the arrows and with the electrical conductors removed.
Figure 12:
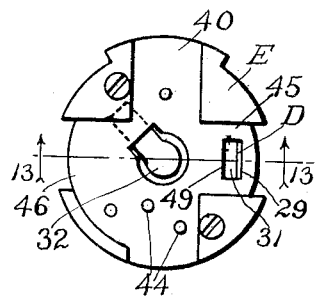
Fig. 12 is a detail in front elevation of the locking-disk with the movable parts thereof removed.
Figure 13:
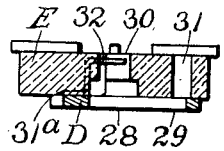
Fig. 13 is a radial sectional view on the line 13—13 of Fig. 12.
Figure 14:
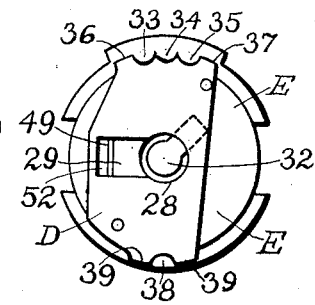
Fig. 14 is a reverse or rear view in elevation of the locking-disk and the distributing-plate or disk carried by the locking-disk.
Figure 15:
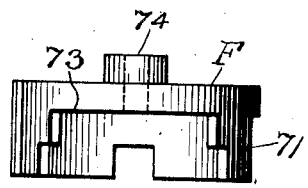
Fig. 15 is a side elevation of the front or cover-section of the controller unit.
Figure 16:
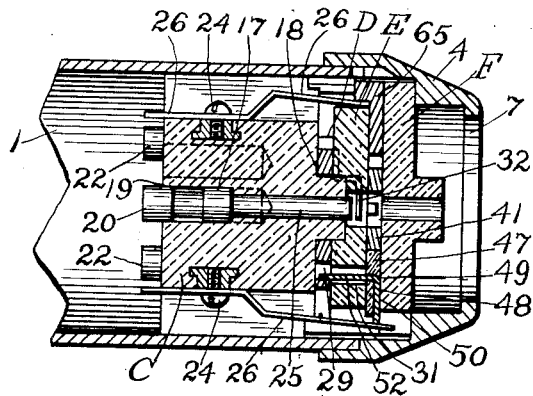
Fig. 16 is a fragmentary sectional view on the line 16—16 of Fig. 1.
Figure 17:
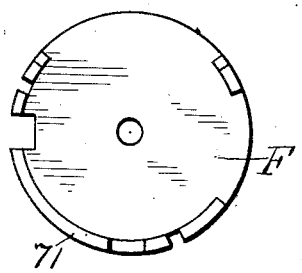
Fig. 17 is a rear elevation of the front or cover-section illustrated in Fig. 15.
Figure 18:
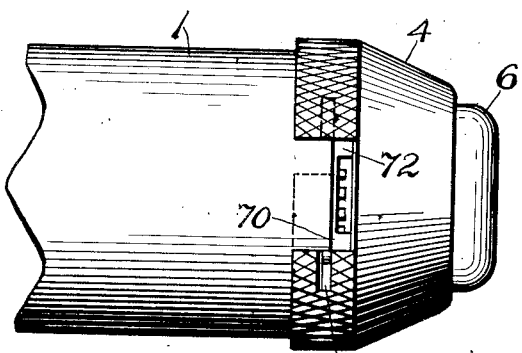
Fig. 18 is a side elevation of the front portion of the controller housing.
Figure 21:
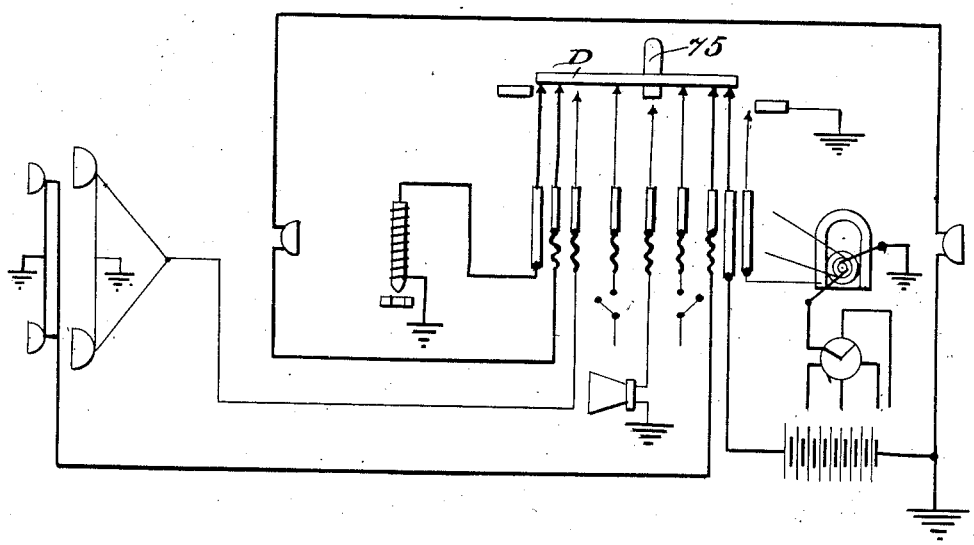
Fig. 21 is a similar view illustrating the circuits when the key is in position, the magneto "ground" released and the head-lights burning dim, the gasolene-lock circuit being closed.
Figure 22:
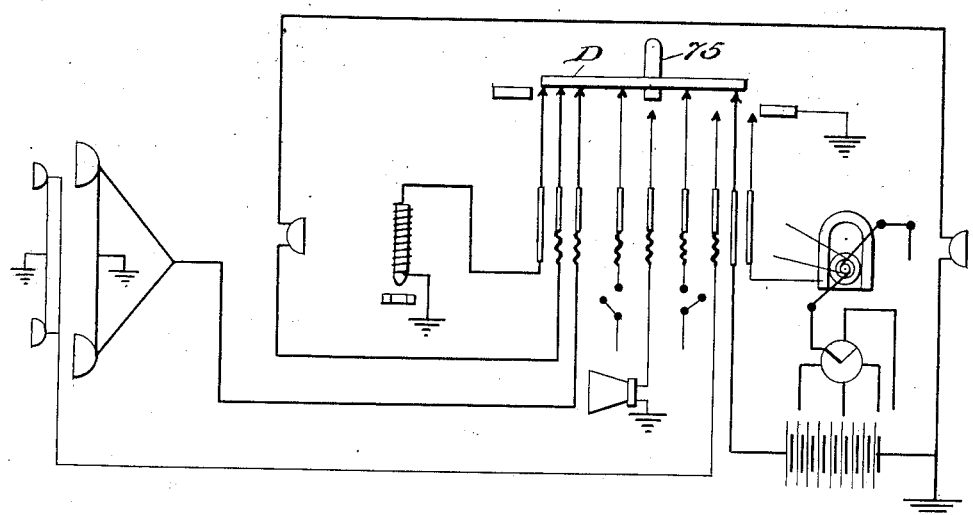
Fig. 22 is a similar view illustrating the circuits when the magneto "ground" is released and head-lights burning bright, the gasolene-circuit being "closed."
Figure 23:
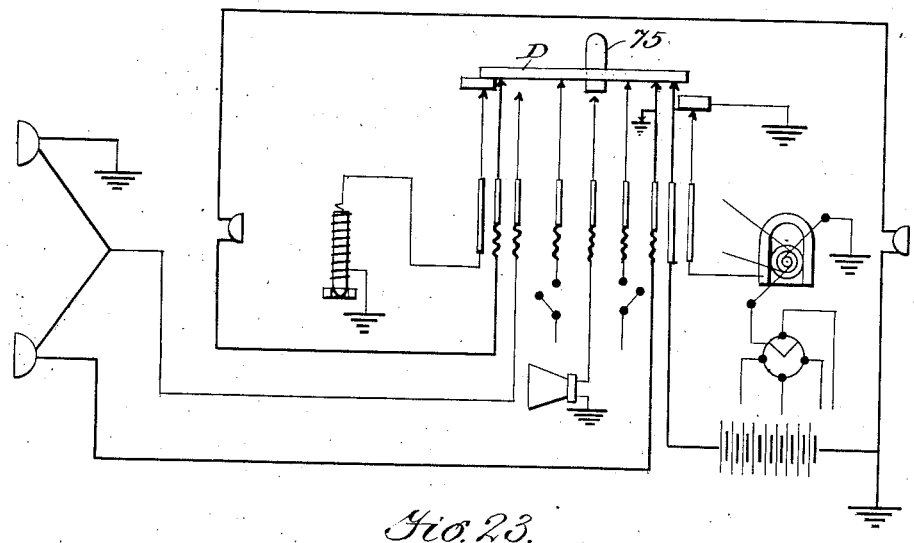
Fig. 23 is a similar view illustrating the circuits when the controller-key has been removed, the magneto-field "grounded" and the head-lights burning dim.
Figure 24:
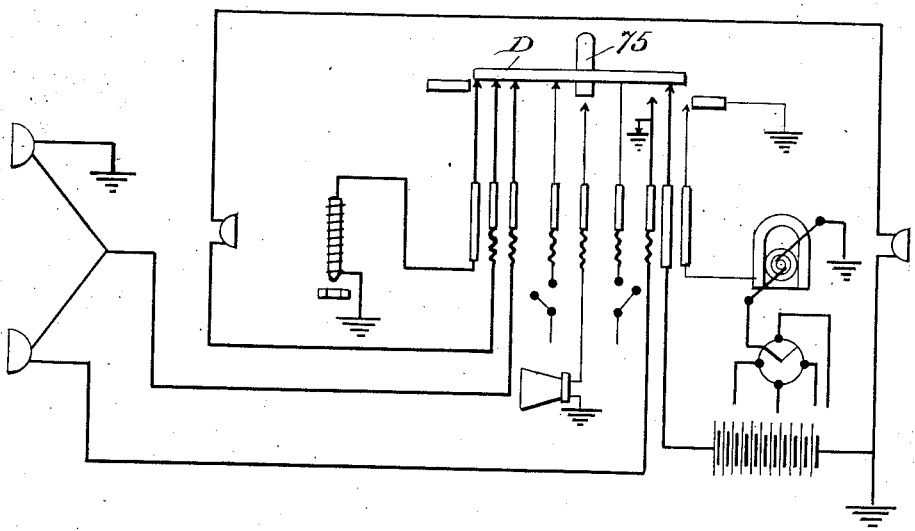
Fig. 24 is a similar view illustrating the circuits when the controller-key is in position therein, the magneto "ground" released, the lights burning bright, and the gasolene-lock is open.

Within the recess 45, there is seated a radial movable slide-block 47, formed of insulating material. This block has its front face provided with a shallow rectangular recess 48, extending to its outer edge where it is widened. At the inner end of the recess 48 there is formed in the bottom thereof a rectangular opening 49 (see dotted lines Fig. 9), which registers with the radial slot 29 of the distributing-plate and slightly overlaps the outer edge of the same (see Figs. 14 and 16). Within the recess 48 of the block 47, is a metal contact-plate 50, which conforms to the shape of the recess and therefore embodies at its outer edge a segmental widened contact-portion 51. At its inner end this plate is further provided with a rearwardly projecting contact-lug 52, which extends through the opening 31 of the locking-section E and into the radial slot 29 of the adjacent distributing plate D. It will be noted that this slide-block and its contact-plate are positioned adjacent the front end of the spring contact-finger of the gas-lock circuit, in the present instance, so that said spring contact-finger bearing at its front end against the metal contact-plate of the slide-block, forces the latter inward and therefore out of contact with the distributing-plate. The inner end of the slide-block when thus forced inward lies in the path of the key and hence in the recess 40. In order that it may not offer an obstruction to the insertion of the key, and, moreover, to provide means whereby when the key is inserted the slide-block will be automatically forced outward against the tension of the spring-finger and contact between the contact-plate and distributing-plate established, the inner end of said slide-block is provided with a cam-shoulder 53.

The advance corners of the key may be rounded and as one of the same rides over the cam-shoulder 53, said slide-block is moved as heretofore described and the bent end or contact-lug 52 of the contact-plate 50 is brought into electrical contact with the outer edge or end of the slot 29 of the distributing-plate, and thus the electrical circuit of the gas-lock is completed. It will be obvious that a withdrawal of the key will automatically interrupt the circuit.

The gas-lock may or may not be included in the system, and if not so employed, the presence of the mechanism just described will not be required. If employed, however, it is preferred that the same be constructed substantially as illustrated in Fig. 25 of the drawings. In this construction, 54 and 54$^a$ designates respectively the inlet or feed-pipes leading from the gasolene-tank to the carbureter and located at opposite sides of a small housing 55, in the sides of which said pipes are tapped. This housing contains a short pipe-section 56, which connects the adjacent ends of the pipes 55 and 55$^a$ and also constitutes a valve-chamber. At the lower end of this chamber is formed a valve-seat 57, adapted to be closed by a vertically moving valve 58, influenced by a solenoid 59, contained within the casing or housing and surrounding the valve-chamber and valve.

The operation of this construction of lock for the gasolene supply will be readily understood. The solenoid, when the current is "on" influences or lifts the valve from its seat, and when the current is "off" the valve drops by gravity or may be closed upon its seat by a spring, whereupon the supply of gasolene is interrupted. It will be apparent that the mere act of withdrawing the controller-key will thus automatically interrupt the gas-lock circuit, and a reinsertion of the key will automatically reëstablish said circuit. Thus the automobile cannot be moved under its own power unless and until the key is inserted in its place in the controller.

Mounted to slide in the slot or recess 46 of the locking-disk or section D, is a metal slide-plate 60, provided at its outer edge with a locking-lug 61, and at its inner end or side with a rounded cam-shoulder 62, the side edge of the plate adjacent the cam-shoulder being formed with a notch 63. At one side of the plate is pivoted a small bell-crank lever 64, one branch of which works loosely in the notch 63 of the plate 60, and the other branch of which extends into the recess 40, and therefore in the path of the key 41. The rear side of the plate 60, near its outer end is provided with a notch 65 and into the same takes the front free end of the spring contact-finger 26 of the magneto-circuit. The side of the key 41 adjacent the plate 60 is provided with a shallow recess 67 to receive the rounded shoulder 62 of the plate when the key is in position. As the key is inserted one of the advance rounded corners thereof comes in contact with the tail of the bell-crank lever 64 and through the operation of the latter retracts the plate 60 against the tension of the spring contact-finger 26 which latter when not thus influenced forces said plate outward so that it "grounds" with the casing. When in this position, the magneto being "grounded," the automobile will be locked against operation under its own power owing to the failure of its ignition-system. The lug 61 of the plate 60, when the latter is thus uninfluenced by the presence of the key, enters one of a plurality of locking-notches 68, formed in the cap 4 of the housing. It will thus be seen that the cap can only be rotated during such time that the key is in position in the controller. This cap is provided with opposite bayonet-slots 69, designed when the cap is rotated in one direction to interlock with companion lugs 70, projecting from the exterior of the casing or housing 1. Of course, it will be understood, that in a system of ignition where the circuit is broken, this slide-plate 60 may be utilized by so constructing the parts that when the key is removed the circuit is broken and when the key is inserted the circuit is restored.

The cover-section F, of the controller unit, is formed with a surrounding rearwardly disposed flange 71, provided at proper intervals with openings or breaks for the purpose of permitting the protrusion of the various parts, and also with a slot 73, corresponding to the slot 72 of the cap 4, for the accommodation of the controller-key. This cover-section is further provided at its center and at its front side with a perforated boss 74, which is a continuation of the central bores of the sections in rear thereof. This perforated boss receives a plunger 75, secured centrally to the rear face of the push-button 6. A coiled-spring 76, is interposed between the rear face of the push-button and the front face of the cover-section F, the spring being held in position by the before-mentioned boss 74. This spring, as will be obvious normally presses the button 6 forward, so that the plunger 75 carried by the button is out of contact with the head 32 of the spring contact-plate 31$^a$. When, however, the push-button is pressed and therefore moved inward against the tension of the spring 76, the plunger traveling in the boss 74, contacts with the head 32 of the contact-plate 31$^a$, forcing the latter rearward and into contact with the pin 25, and the latter into contact with the front end, of in this instance, the central fuse-plug 20, thereby completing the circuit of the battery in a manner obvious and sounding the electrically operated alarm-device.

The various circuits will be readily understood by reference to Figs. 19 to 24 of the drawings, taken in connection with a brief description, so that any further detailed description is deemed unnecessary.

It will be apparent that the herein described controller is located within easy reach of and manipulation by the hands of the operator, and that by a slight movement of one hand and without removal from the steering-wheel, he may promptly sound the alarm or so manipulate the controller-key as to instantly dim or brighten the head-lights without disturbing either his tail-light or dash-light.

The sections C. D. E and F, constitute a single unit when assembled and may be handled as such. To accomplish this it is necessary that some means be provided for holding these parts together in such manner that while they may be handled as a unit and as such readily withdrawn and inserted from and within the housing, yet may be readily separated for inspection, repair, &c. As a convenient means for securing the aforesaid sections together, I employ, in this instance, a plurality (preferably two) binders 77, the same being short pieces of wire bent at their ends, as at 78, and designed to fit within correspondingly formed grooves 79, located in the sides and ends of the unit. These binders, while ample for the purpose of retaining the parts of the unit in their proper relative position, yet may be readily slipped from their grooves when a separation of the parts is desired.

It is likewise desirable that some means be provided for guiding the unit into position within the housing so that the unit will be positioned in proper relation with the base of the controller. As one ready means for accomplishing this, I provide the unit in one side with a longitudinal groove 80, designed to receive a corresponding guiderib 81, formed at a proper point in the housing. This groove, it will be understood, is continued in the base-section of the controller, and likewise does the guide-rib extend rearwardly in the housing. By this provision it is apparent that these parts can only be inserted in the housing and relatively assembled in proper position for operation.

The notches 68, formed in the flange of the cap 6, are, in this instance, two in number, and they are so positioned with relation to the lug 61, and the notches 33, 34 and 35, of the conducting-plate, that said lug 61 will enter one of the notches when the conducting-plate is rotated to either its neutral or head-light dim positions. In the remaining position, that is, head-light bright, the lug 61 abuts against the flange of the cap and is therefore immovable. When in the latter position, its lug 62 lies in the path of the shoulder 67 of the key, so that the latter cannot be withdrawn from the controller while the main lamps of the head-lights are bright. By moving the conducting-plate to either the neutral or head-light dim positions, the lug 61 may enter one of the notches 68, being forced therein by the spring connected to the locking-plate, and hence, the lug 62 of said plate will be withdrawn from the path of the key and no longer obstruct the withdrawal of the same. This is a very important and desirable feature of the invention, in that it effects a saving of the batteries by obviating the possibility of the driver or operator withdrawing the key and leaving the car standing with the main lamps of the head-lights brightly burning.

I have herein illustrated and described in detail the construction of a controller best adapted, in my judgment for use in my system, but I do not desire to be understood as limiting the invention to this particular construction of controller. Novel features of construction of the controller not herein claimed, form the subject-matter of a companion application filed February 24th, 1917, Serial Number 150,649, this application being a division of that application.

Having described my invention, what I claim, is:

1. In an electrical control system for automobiles, the combination with an electrical supply, a gasolene supply, an electro-responsive gasolene lock, a magneto in circuit with the electro-responsive device, and a removable key to control the gasolene lock and magneto circuit by its insertion and removal.

2. In an electrical control system for automobiles, the combination with an electrical supply, a gasolene supply, a valve for said supply, an electro-magnet for controlling said valve, main and auxiliary lamps for the automobile together with circuits therefor, and a controller comprising a removable key slidably movable to control the gasolene magnet and rotatable to control the lamps and to connect them with the electrical supply.

3. In an electrical control system for automobiles, the combination with an insulating conductor-support, and a spring contact-finger projecting therefrom, of a rotary distributing-plate having an opening and arranged at one end of the conductor support, an insulated plate mounted on the distributer-plate and having a radial recess at one side forming guides, an insulated slide mounted in said guides, a contact-plate carried by the slide and in contact with the spring contact-finger, which latter serves to normally press the slide inwardly into the recess, a contact-finger carried by the contact-plate and projecting through an opening in the insulated plate and to a point opposite one edge of the radial recess of the distributing-plate, being maintained out of contact therewith by the spring contact-finger of the support, a key adapted to removably enter the insulated plate and force said slide and its contact-plate outwardly and until the latter is in electrical contact with the distributing-plate, a battery, conductors for the same in circuit with the spring contact-finger and the said distributing-plate, a gasolene feed-pipe leading from a source of supply and provided with a valve-seat, a gravity closing valve located in the seat, a solenoid surrounding and adapted to elevate the valve from the seat and arranged in the battery circuit.

4. In an electrical control system for automobiles, the combination with the electrical supply, the head-lights, and the circuits for such, of a controlling mechanism for the lights operable by means of a key, a key removable from such controlling mechanism, and means for locking the key against withdrawal from said controlling mechanism when the main lamps of the head-lights are "on".

5. In an electrical control system for automobiles, the combination with the electrical supply, the main and auxiliary lamps of the head-lights, the tail-light, and the circuits for such, of a housing, a control mechanism contained therein, a key removably mounted in the control mechanism for operating the same, and means for securing the key against removal from the controller when the circuit of the main lamps of the head-lights is unbroken but permitting such removal when the circuit of the tail-light is complete.

6. In an electrical control system for automobiles, the combination with the main and auxiliary lamps of the head-light, the tail-lamp, and the circuits for such, of a housing to which said circuits lead, a controller mechanism within the housing and operable by means of a key removable therefrom, and means for preventing the withdrawal of the key from the controller when the circuit of the main lamps of the head-lights is unbroken and permitting such withdrawal when the circuits of the tail-lamp and auxiliary lamps are complete.

7. In an electrical control system for automobiles, the combination with the electrical supply, the head lights and the circuits therefor, of an electrical gasolene lock, a controlling mechanism for the lights and the lock operable by means of a key, a key removable from the mechanism but adapted to electrically release the gasolene lock whenever inserted in the controller, and means for securing the key against removal from the controller when the main head lights are lighted.

8. In an electrical control system for automobiles, the combination with the electrical supply, main and auxiliary head lights and the circuits therefor, of a magneto and an electrical circuit therefor, a controlling mechanism for the said circuits operable by means of a key, a key removable from the mechanism to close the magneto circuit when inserted, and means for securing the key against removal from the controller when the circuit of the main head lights is closed but permitting such removing when the auxiliary head lights are lighted.

9. In an electrical control system for automobiles, the combination with the electrical supply, main and auxiliary head lights and circuits therefor, of an electrical gasolene lock, a magneto in circuit with the gasolene lock, a controller operable by means of a key, and a key slidably insertable in the controller to close the magneto and gasolene lock circuit and rotatable when inserted to close the circuit either for the main or the auxiliary head lights.

10. In an electrical control system for automobiles, the combination with a gasolene-lock having a valve, a solenoid which when energized is adapted to open the valve, and a battery for operating the solenoid in circuit therewith, of a controller in said circuit, lamps in said circuit, a magneto and its circuit, means in the controller for normally grounding the magneto, and a key for operating the controller, said key when in position in the controller being adapted to break the grounding of the magneto and complete the circuit of the solenoid and when removed from said controller to permit of the grounding of the magneto and to break the circuit of the solenoid.

WENDELIN P. SENG.

In the presence of—
Geo. F. Hassel,
W. H. Potter.